US010518467B2

(12) United States Patent
Kon et al.

(10) Patent No.: US 10,518,467 B2
(45) Date of Patent: Dec. 31, 2019

(54) METHOD FOR PRODUCING FILM

(71) Applicant: Sumitomo Chemical Company, Limited, Tokyo (JP)

(72) Inventors: Yusuke Kon, Niihama (JP); Tatsuya Kataoka, Niihama (JP); Hideyuki Hamamura, Niihama (JP)

(73) Assignee: SUMITOMO CHEMICAL COMPANY, LIMITED, Tokyo (JP)

( * ) Notice: Subject to any disclaimer, the term of this patent is extended or adjusted under 35 U.S.C. 154(b) by 329 days.

(21) Appl. No.: 15/385,236

(22) Filed: Dec. 20, 2016

(65) Prior Publication Data
US 2017/0173848 A1 Jun. 22, 2017

(30) Foreign Application Priority Data
Dec. 22, 2015 (JP) .................................. 2015-250571

(51) Int. Cl.
*B29C 53/82* (2006.01)
*B29C 53/18* (2006.01)
(Continued)

(52) U.S. Cl.
CPC .......... *B29C 53/18* (2013.01); *B29C 37/0025* (2013.01); *B29C 43/003* (2013.01);
(Continued)

(58) Field of Classification Search
CPC ....... B29C 59/02; B29C 53/18; B29C 55/085; B29C 69/002; B65H 23/032; B65H 35/02; H01M 2/1686; H01M 2/145
See application file for complete search history.

(56) References Cited

U.S. PATENT DOCUMENTS 7,687,012 B2 * 3/2010 Daniels .................... D04H 3/05
264/103
2002/0132162 A1 * 9/2002 Takata .................... B26D 1/025
429/129
(Continued)

FOREIGN PATENT DOCUMENTS

JP 2004182434 A 7/2004
WO 2013/099539 A1 7/2013
WO WO-2013099539 A1 * 7/2013 ........... B29C 55/005

OTHER PUBLICATIONS

Office Action dated Jan. 24, 2019 in U.S. Appl. No. 15/386,786, by Wang.

*Primary Examiner* — Nahida Sultana
*Assistant Examiner* — Debjani Roy
(74) *Attorney, Agent, or Firm* — Panitch Schwarze Belisario & Nadel LLP

(57) ABSTRACT

The separator production method in accordance with an embodiment of the present invention includes a coated article taking up step of taking up a separator original sheet by winding the separator original sheet on an outer peripheral surface of a core while oscillating the core in the rotation axis direction; a coated article winding off step of winding off the separator original sheet, which has been taken up in the coated article taking up step, from the core; and a transferring step of transferring the separator original sheet, which has been wound off in the coated article winding off step, such that a state of being distorted in a wavelike manner in the transverse direction is maintained.

5 Claims, 6 Drawing Sheets

(51) Int. Cl.

| | |
|---|---|
| *B29C 55/02* | (2006.01) |
| *H01M 10/0525* | (2010.01) |
| *B29C 37/00* | (2006.01) |
| *B29C 43/00* | (2006.01) |
| *B29C 69/00* | (2006.01) |
| *B29C 55/08* | (2006.01) |
| *H01M 2/14* | (2006.01) |
| *H01M 2/16* | (2006.01) |
| *B29K 77/00* | (2006.01) |
| *B29L 9/00* | (2006.01) |
| *B29L 31/34* | (2006.01) |
| *B29K 105/04* | (2006.01) |

(52) U.S. Cl.
 CPC ............ *B29C 53/82* (2013.01); *B29C 55/085* (2013.01); *B29C 69/002* (2013.01); *H01M 2/145* (2013.01); *H01M 2/1686* (2013.01); *B29C 55/02* (2013.01); *B29K 2023/06* (2013.01); *B29K 2077/10* (2013.01); *B29K 2105/04* (2013.01); *B29L 2009/005* (2013.01); *B29L 2031/3468* (2013.01); *H01M 10/0525* (2013.01)

(56) References Cited

U.S. PATENT DOCUMENTS

2010/0012764 A1\* 1/2010 Pirtle ................ B65H 18/10
 242/520
2014/0374947 A1\* 12/2014 Ichinomiya .......... B29D 99/005
 264/175

\* cited by examiner

METHOD FOR PRODUCING FILM

This Nonprovisional application claims priority under 35 U.S.C. § 119 on Patent Application No. 2015-250571 filed in Japan on Dec. 22, 2015, the entire contents of which are hereby incorporated by reference.

TECHNICAL FIELD

The present invention relates to a method for producing a film.

BACKGROUND ART

A method for producing a film includes various processes such as winding off and taking up of a film which serves as a base material. With regard to a production of a film, Patent Literature 1 discloses a technique to take up a film while causing oscillation.

Moreover, Patent Literature 2 discloses a technique in which a wide web roll which has been taken up while being oscillated is slit into narrow webs and the narrow webs are taken up into respective rolls.

CITATION LIST

Patent Literature

[Patent Literature 1]
International Publication No. 2013/099539 (Publication date: Jul. 4, 2013)
[Patent Literature 2]
Japanese Patent Application Publication Tokukai No. 2004-182434 (Publication date: Jul. 2, 2004)

SUMMARY OF INVENTION

Technical Problem

In a case where a film is taken up while being oscillated, the film is wound on a core in a state where the film is distorted in a wavelike manner in a transverse direction. Therefore, the film is to be wound off in a state of being distorted in a wavelike manner in the transverse direction.

However, in the film which has been wound off, it sometimes happens that the state of being distorted in a wavelike manner in the transverse direction is loosened in a subsequent transferring process. Therefore, in a case where the film is to be subjected to a process such as slitting in the state of being distorted in a wavelike manner in the transverse direction, it is necessary to carry out oscillation again when the process is carried out.

The present invention is accomplished in view of the problem, and its object is to provide a film production method with which it is possible to carry out a process with respect to the film which is in a state of being distorted in a wavelike manner in the transverse direction without carrying out oscillation again.

Solution to Problem

In order to attain the object, the film production method in accordance with an aspect of the present invention includes the steps of: taking up a film by winding the film on an outer peripheral surface of a core while oscillating the core in a rotation axis direction; winding off the film, which has been taken up in the taking up step, from the core; and transferring the film, which has been wound off in the winding off step, such that a state of being distorted in a wavelike manner in the rotation axis direction is maintained.

Advantageous Effects of Invention

According to the present invention, it is possible to bring about an effect of providing the film production method with which it is possible to carry out a process with respect to the film which is in a state of being distorted in a wavelike manner in the transverse direction without carrying out oscillation again.

Figure 1:
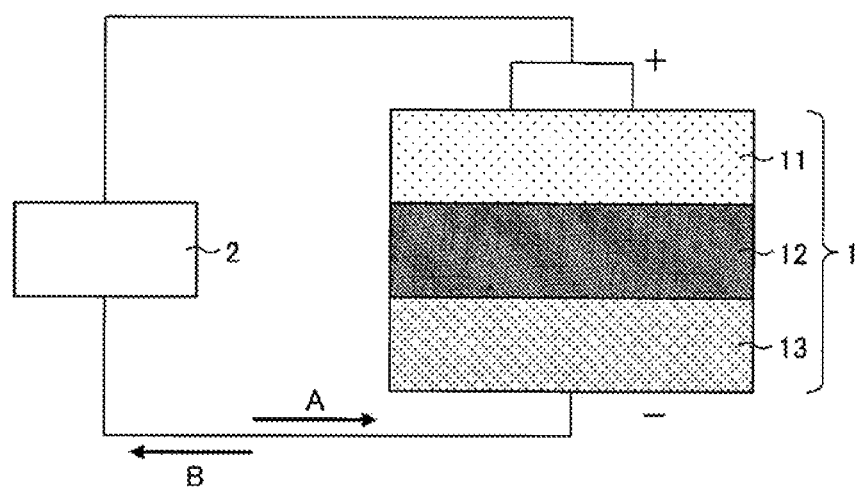
FIG. 1 is a diagram schematically illustrating a cross sectional configuration of a lithium-ion secondary battery.
Figure 2:
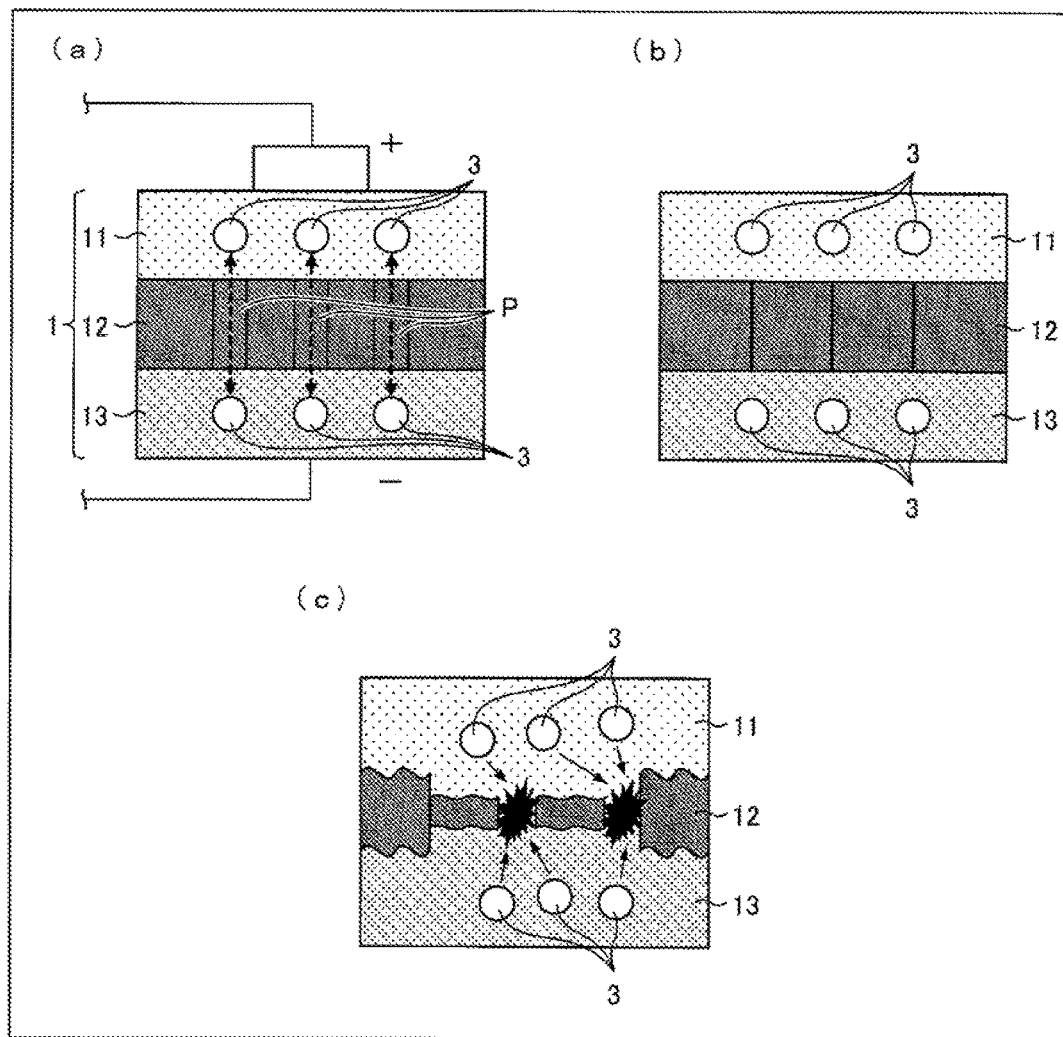

Each of (a) through (c) of FIG. 2 is a diagram schematically illustrating a state of the lithium-ion secondary battery illustrated in FIG. 1.

Figure 3:
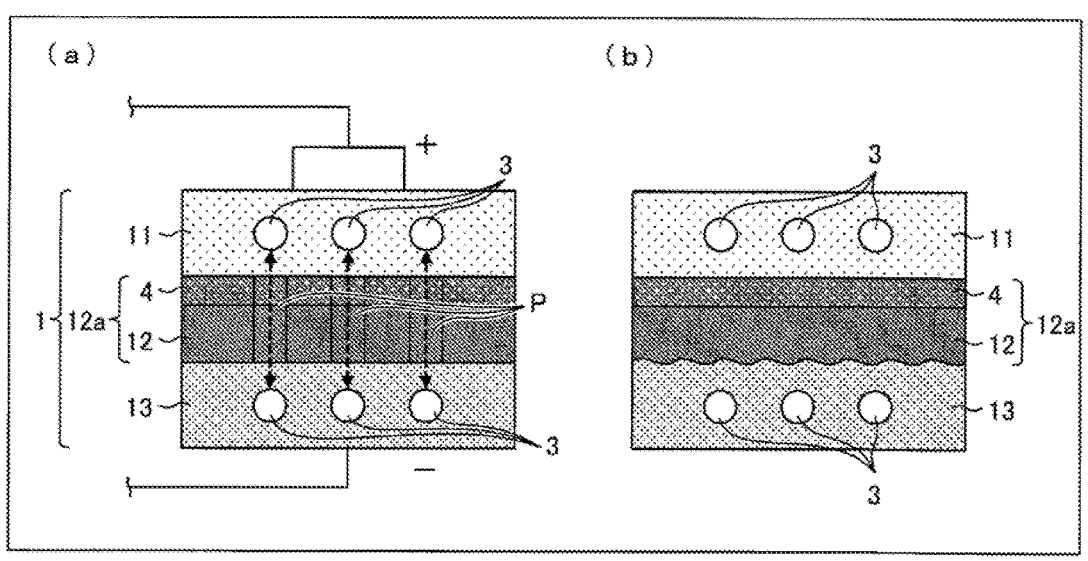

Each of (a) and (b) of FIG. 3 is a diagram schematically illustrating a state of a lithium-ion secondary battery having another configuration.

Figure 4:
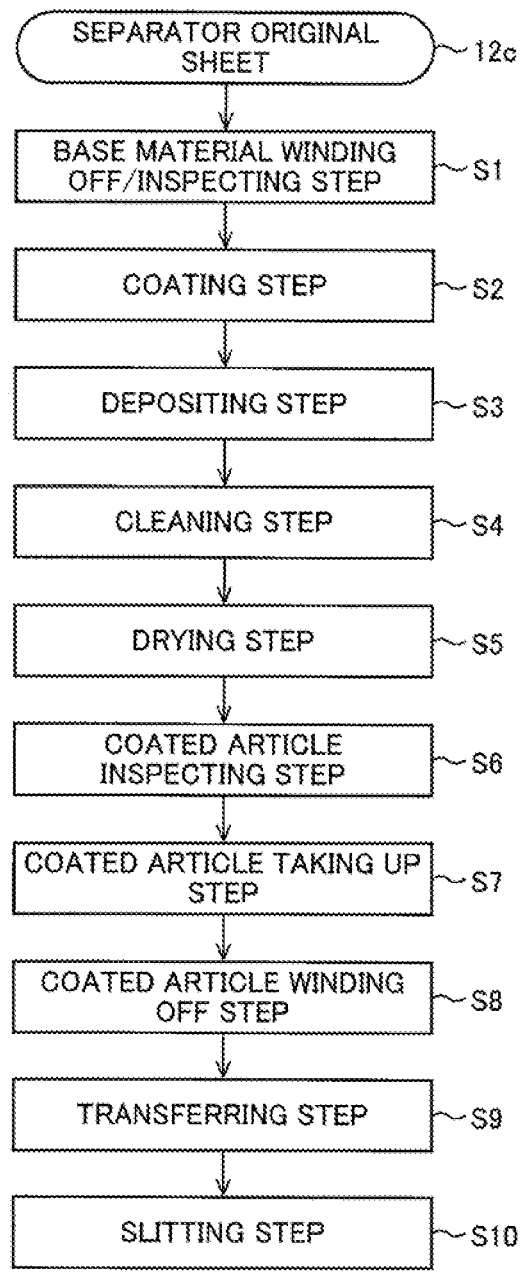

FIG. 4 is a flow chart schematically showing a method for producing a separator.

Figure 5:
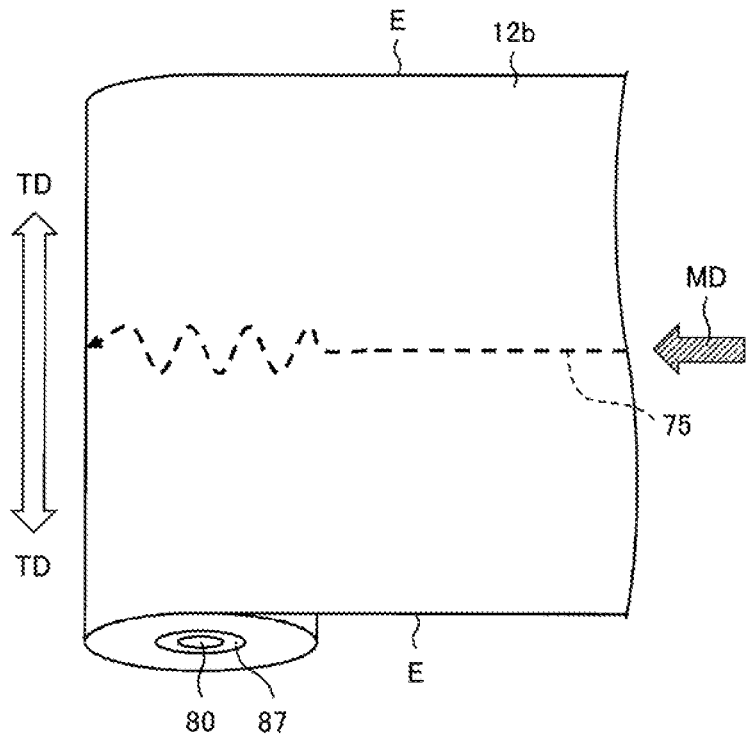

FIG. 5 is a top surface view illustrating an example of a coated article taking up step shown in FIG. 4.

Figure 6:
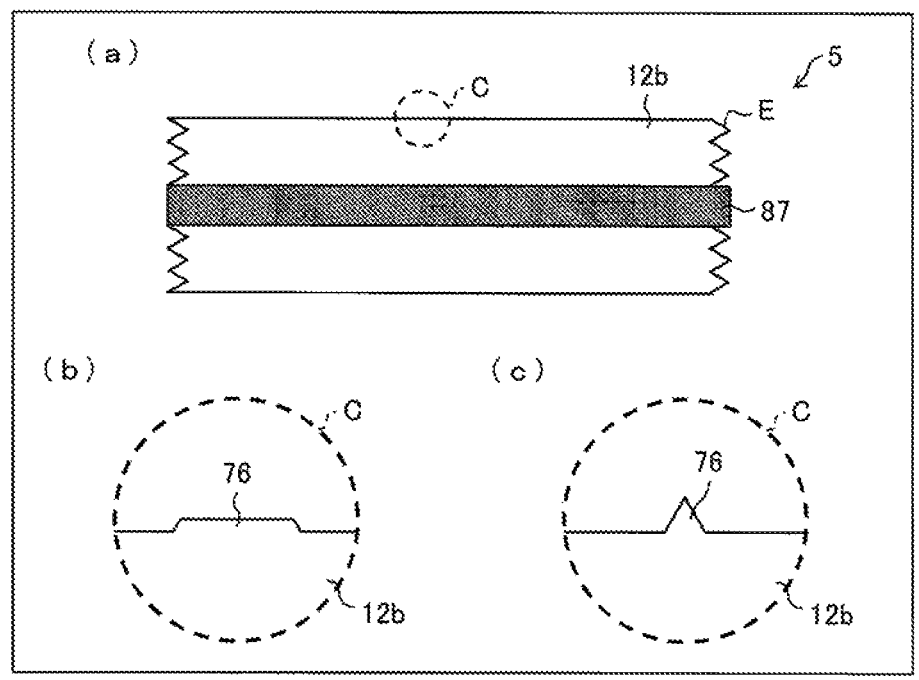

(a) of FIG. 6 is a cross-sectional view illustrating a roll obtained by the coated article taking up step shown in FIG. 5. (b) of FIG. 6 is an enlarged view illustrating a surface of a heat-resistant separator original sheet in a dotted-line frame shown in (a) of FIG. 6. (c) of FIG. 6 is a reference diagram illustrating a surface of a heat-resistant separator original sheet which has been taken up without oscillating a core in the coated article taking up step.

Figure 7:
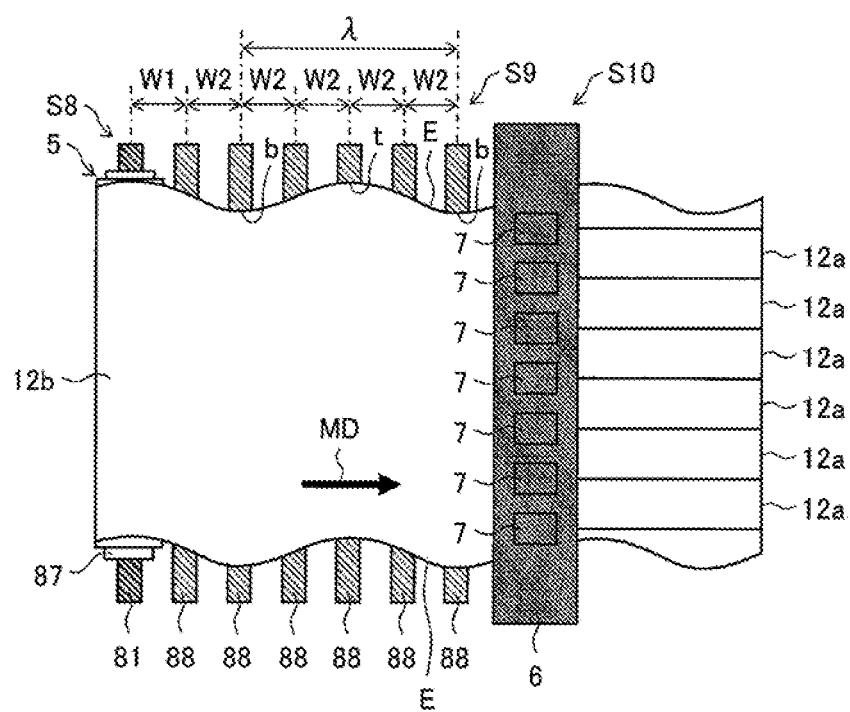

FIG. 7 is a top surface view illustrating an example of a coated article winding off step, a transferring step, and a slitting step shown in FIG. 4.

DESCRIPTION OF EMBODIMENTS

The following description will discuss an embodiment of the present invention with reference to FIGS. 1 through 7. In the present embodiment, an example case is described in which the film production method in accordance with an aspect of the present invention is applied to a production of a separator for a lithium-ion secondary battery (hereinafter, sometimes referred to as "separator").

First, the lithium-ion secondary battery will be discussed with reference to FIGS. 1 through 3.

[Configuration of Lithium Ion Secondary Battery]

A nonaqueous electrolyte secondary battery, typically, a lithium-ion secondary battery has a high energy density, and therefore, is currently widely used not only as batteries for use in devices such as personal computers, mobile phones, and mobile information terminals, and for use in moving bodies such as automobiles and airplanes, but also as stationary batteries contributing to stable power supply.

FIG. 1 is a diagram schematically illustrating a cross sectional configuration of a lithium-ion secondary battery 1. As illustrated in FIG. 1, the lithium-ion secondary battery 1 includes a cathode 11, a separator 12, and an anode 13. Between the cathode 11 and the anode 13, an external device 2 is connected outside the lithium-ion secondary battery 1. Then, while the lithium-ion secondary battery 1 is being charged, electrons move in a direction A. On the other hand, while the lithium-ion secondary battery 1 is being discharged, electrons move in a direction B.

(Separator)

The separator 12 (film) is provided so as to be sandwiched between the cathode 11 which is a positive electrode of the lithium-ion secondary battery 1 and the anode 13 which is a negative electrode of the lithium-ion secondary battery 1. The separator 12 separates the cathode 11 and the anode 13, allowing lithium ions to move between the cathode 11 and the anode 13. For example, polyolefin such as polyethylene or polypropylene is used as a material of the separator 12.

Each of (a) through (c) of FIG. 2 schematically illustrates a state of the lithium-ion secondary battery 1 illustrated in FIG. 1. (a) of FIG. 2 illustrates a normal state. (b) of FIG. 2 illustrates a state in which a temperature of the lithium-ion secondary battery 1 has risen. (c) of FIG. 2 illustrates a state in which a temperature of the lithium-ion secondary battery 1 has sharply risen.

As illustrated in (a) of FIG. 2, the separator 12 is provided with many pores P. Normally, lithium ions 3 in the lithium-ion secondary battery 1 can move back and forth through the pores P.

However, there are, for example, cases in which the temperature of the lithium-ion secondary battery 1 rises due to excessive charging of the lithium-ion secondary battery 1, a high current caused by short-circuiting of the external device 2, or the like. In such cases, the separator 12 melts or softens and the pores P are blocked as illustrated in (b) of FIG. 2. As a result, the separator 12 shrinks. This stops the back-and-forth movement of the lithium ions 3, and consequently stops the above temperature rise.

However, in a case where a temperature of the lithium-ion secondary battery 1 sharply rises, the separator 12 suddenly shrinks. In this case, as illustrated in (c) of FIG. 2, the separator 12 may be destroyed. Then, the lithium ions 3 leak out from the separator 12 which has been destroyed. As a result, the lithium ions 3 do not stop moving back and forth. Consequently, the temperature continues rising.

(Heat-Resistant Separator)

Each of (a) and (b) of FIG. 3 schematically illustrates a state of a lithium-ion secondary battery 1 having another configuration. (a) of FIG. 3 illustrates a normal state, and (b) of FIG. 3 illustrates a state in which a temperature of the lithium-ion secondary battery 1 has sharply risen.

As illustrated in (a) of FIG. 3, the lithium-ion secondary battery 1 can further include a heat-resistant layer (functional layer) 4. The heat-resistant layer 4 can be provided to the separator 12. (a) of FIG. 3 illustrates a configuration in which the separator 12 is provided with the heat-resistant layer 4 serving as a functional layer. A film in which the separator 12 is provided with the heat-resistant layer 4 is hereinafter referred to as a heat-resistant separator (film) 12a.

In the configuration illustrated in (a) of FIG. 3, the heat-resistant layer 4 is laminated on a surface of the separator 12 which surface is on a cathode 11 side. Note that the heat-resistant layer 4 can alternatively be laminated on a surface of the separator 12 which surface is on an anode 13 side, or both surfaces of the separator 12. Further, the heat-resistant layer 4 is provided with pores which are similar to the pores P. Normally, the lithium ions 3 move back and forth through the pores P and the pores of the heat-resistant layer 4. The heat-resistant layer 4 contains, for example, wholly aromatic polyamide (aramid resin) as a material.

As illustrated in (b) of FIG. 3, even in a case where the temperature of the lithium-ion secondary battery 1 sharply rises and as a result, the separator 12 melts or softens, the shape of the separator 12 is maintained because the heat-resistant layer 4 supports the separator 12. Therefore, such a sharp temperature rise results in only melting or softening of the separator 12 and consequent blocking of the pores P. This stops the back-and-forth movement of the lithium ions 3 and consequently stops the above-described excessive discharging or excessive charging. In this way, the separator 12 can be prevented from being destroyed.

[Flow for Producing Separator]

The following description will discuss a flow for producing a separator.

FIG. 4 is a flow chart schematically showing a method for producing a separator. The separator is configured such that a functional layer is laminated on an original sheet of a separator (hereinafter, referred to as "separator original sheet") which original sheet serves as a base. A film made of polyolefin or the like is used for the separator original sheet. Examples of the functional layer encompass a heat-resistant layer and an adhesive layer.

The functional layer is laminated on the separator original sheet by (i) coating the separator original sheet with coating (a material) or the like corresponding to the functional layer and then (ii) drying the separator original sheet.

FIG. 4 shows, as an example, a flow for producing the heat-resistant separator 12a in a case where the functional layer is the heat-resistant layer 4. The flow shown in FIG. 4 is an example of a flow in which wholly aromatic polyamide (aramid resin) employed as a material for the heat-resistant layer 4 is laminated on a polyolefin base film which is a separator original sheet (film) 12c.

The above flow includes a base material winding off/inspecting step S1, a coating step S2, a depositing step S3, a cleaning step S4, a drying step S5, a coated article inspecting step S6, a coated article taking up step (taking up step) S7, a coated article winding off step (winding off step, method for winding off a film) S8, a transferring step S9, and a slitting step S10.

(Production Step of Producing Base Material)

First, the following description will discuss production of the separator original sheet 12c serving as a base material, by using, as an example, a case where the separator original sheet 12c mainly contains polyethylene as a material.

The following description will discuss, as an example, a production method for producing the separator original sheet 12c in which production method a thermoplastic resin in which a pore forming agent is added is shaped into a film and then the pore forming agent is removed by use of an appropriate solvent. Specifically, in a case where a polyethylene resin containing an ultra-high molecular weight polyethylene is used as a material of the separator original sheet 12c, steps (A) through (D) below are sequentially carried out in the production method.

(A) Kneading Step

A step of obtaining a polyethylene resin composition by kneading an ultra-high molecular weight polyethylene and an inorganic filler such as a calcium carbonate.

(B) Rolling Step

A step of forming a film by use of the polyethylene resin composition obtained in the kneading step.

(C) Removal Step

A step of removing the inorganic filler from the film obtained in the rolling step.

(D) Stretching Step

A step of obtaining the separator original sheet 12c by stretching the film obtained in the removal step.

According to the above production method, in the removal step (C), many fine pores are provided in the film. The fine pores of the film stretched in the stretching step (D) become the above-described pores P. The separator original sheet 12c formed as a result is a polyethylene microporous film having a prescribed thickness and a prescribed air permeability.

In the kneading step (A), 100 parts by weight of the ultra-high molecular weight polyethylene, 5 parts by weight to 200 parts by weight of a low molecular weight polyolefin having a weight-average molecular weight of not more than 10000, and 100 parts by weight to 400 parts by weight of the inorganic filler can be kneaded.

Note that even in a case where the separator original sheet 12c contains another material, the separator original sheet 12c can be produced by similar production steps. The method for producing the separator original sheet 12c is not limited to the method in which the pore forming agent is removed, and various methods can be used for producing the separator original sheet 12c.

The following description will sequentially discuss the steps S1 through S10 which are subsequent to the production step of producing the separator original sheet 12c. Note that the steps S1 through S10 are carried out in this order.

(Base Material Winding Off/Inspecting Step S1)

The base material winding off/inspecting step S1 is a step of winding off, from a roll, the separator original sheet 12c which is a base material for a function-provided separator. Further, the base material winding off/inspecting step S1 is a step of inspecting the separator original sheet 12c, which has been wound off, before carrying out the subsequent coating step.

(Coating Step S2)

The coating step S2 is a step of coating, with coating (a material) for the heat-resistant layer 4, a separator original sheet 12c which has been wound off in the base material winding off/inspecting step S1. In the coating step S2, it is possible to carry out the coating with respect to only one surface of the separator original sheet 12c or both surfaces of the separator original sheet 12c.

For example, in the coating step S2, the separator original sheet 12c is coated with a solution in which aramid is dissolved in NMP (N-methyl-pyrrolidone), as coating for the heat-resistant layer. Note that the heat-resistant layer 4 is not limited to an aramid heat-resistant layer. For example, it is possible to coat the separator original sheet 12c with a suspension of alumina, carboxymethyl cellulose, and water, as the coating for the heat-resistant layer.

A method for coating the separator original sheet 12c with the coating is not specifically limited as long as uniform wet coating can be performed with respect to the separator original sheet 12c by the method, and various methods can be employed.

For example, it is possible to employ any of the methods such as a capillary coating method, a slit die coating method, a spray coating method, a dip coating method, a roll coating method, a screen printing method, a flexo printing method, a bar coater method, a gravure coater method, or a die coater method.

A material for the heat-resistant layer 4 with which material the separator original sheet 12c is coated has a film thickness that can be controlled by adjusting a thickness of a coating wet film and a solid-content concentration in the coating solution.

In the coating step S2, the separator original sheet 12c is preferably coated so that surfaces of respective both edge parts of the separator original sheet 12c in a transverse direction of the separator original sheet 12c are left uncoated as uncoated parts (edge-uncoated coating). Note that the transverse direction is a direction that is substantially perpendicular to the machine direction and the thickness direction of the separator original sheet 12c.

This can prevent the coating from flowing around from a front surface at the both edge parts of the separator original sheet 12c to a back surface of the separator original sheet 12c, unlike in a case where an entire surface coating is carried out so that the coating is applied to the separator original sheet 12c so as to cover up to the surfaces of the respective both edge parts of the separator original sheet 12c. Accordingly, it is possible to reduce a product defect which is caused when the coating flows around to the back surface of the separator original sheet 12c. In a case where the edge-uncoated coating has been carried out, the uncoated parts can be removed in the slitting step S10 which will be described later.

(Depositing Step S3)

The depositing step S3 is a step of solidifying the coating with which the separator original sheet 12c has been coated in the coating step S2. In a case where the coating is an aramid coating, for example, water vapor is applied to a coated surface so that aramid is solidified by humidity deposition. This provides a heat-resistant separator original sheet 12b (see FIG. 5) in which the heat-resistant layer 4 is formed on the separator original sheet 12c.

(Cleaning Step S4)

The cleaning step S4 is a step of cleaning the heat-resistant separator original sheet 12b in which the coating has been solidified in the depositing step S3. In a case where the heat-resistant layer 4 is an aramid heat-resistant layer, for example, water, an aqueous solution, or an alcohol-based solution is suitably used as a cleaning liquid.

Note that the cleaning step S4 can be multistage cleaning in which cleaning is carried out a plurality of times in order to enhance a cleaning effect.

Moreover, after the cleaning step S4, a water removing step can be carried out for removing water from the heat-resistant separator original sheet 12b which has been cleaned in the cleaning step S4. A purpose of the water removing is to remove water or the like that is attached to the heat-resistant separator original sheet 12b before the subsequent drying step S5 so that drying can be carried out more easily and insufficient drying can be prevented.

(Drying Step S5)

The drying step S5 is a step of drying the heat-resistant separator original sheet 12b that has been cleaned in the cleaning step S4. A method for drying the heat-resistant separator original sheet 12b is not particularly limited, and, for example, it is possible to use various methods such as a method in which the heat-resistant separator original sheet 12b is brought into contact with a heated roller or a method in which hot air is blown onto the heat-resistant separator original sheet 12b.

(Coated Article Inspecting Step S6)

The coated article inspecting step S6 is a step of inspecting the heat-resistant separator original sheet 12b which has been dried in the drying step S5. In the inspection, a defect is marked as appropriate, and it is therefore possible to efficiently inhibit the heat-resistant separator original sheet 12b from having a defect.

(Coated Article Taking Up Step S7)

The coated article taking up step S7 is a step of taking up the heat-resistant separator original sheet 12b, which has been subjected to the coated article inspecting step S6, on a core having a cylindrical shape. The heat-resistant separator original sheet 12b which has been taken up on the core can be directly shipped or the like as an original sheet in a state of having a larger width.

FIG. 5 is a top surface view illustrating an example of the coated article taking up step S7 shown in FIG. 4. Note that, in FIG. 5, "MD" indicates a machine direction (i.e., transferring direction) of the heat-resistant separator original sheet 12b.

As illustrated in FIG. 5, in the coated article taking up step S7, the heat-resistant separator original sheet 12b is wound on an outer peripheral surface of the core 87 having a cylindrical shape while the core 87 is oscillated in a rotation axis direction (hereinafter, sometimes referred to as a transverse direction TD (i.e., width direction) of a separator) of the core 87. With the configuration, even in a case where a thickness unevenness 75 is caused along the machine direction of the heat-resistant separator original sheet 12b, it is possible to take up the heat-resistant separator original sheet 12b on the core 87 while dispersing the thickness unevenness 75 in the transverse direction TD. This makes it possible to improve planarity of the surface of the heat-resistant separator original sheet 12b which is in a state of being wound on the outer peripheral surface of the core 87.

(a) of FIG. 6 is a cross-sectional view illustrating a roll 5 obtained in the coated article taking up step S7. (b) of FIG. 6 is an enlarged view illustrating a state of a surface of the heat-resistant separator original sheet 12b in a dotted-line frame C shown in (a) of FIG. 6. (c) of FIG. 6 is a reference diagram illustrating a state of the surface of the heat-resistant separator original sheet 12b which has been taken up without oscillating the core 87 in the coated article taking up step S7.

The roll 5 is a roll of the heat-resistant separator original sheet 12b which is wound on the outer peripheral surface of the core 87 so as to be laminated.

In a case where the heat-resistant separator original sheet 12b is taken up on the core 87 while the core 87 is oscillated in the transverse direction TD, the heat-resistant separator original sheet 12b is wound on the core 87 while being cyclically distorted in a wavelike manner in the transverse direction TD.

Therefore, as illustrated in (a) of FIG. 6, in the roll 5 obtained in the coated article taking up step S7, end parts E of the heat-resistant separator original sheet 12b are not aligned straight but are distorted in accordance with an amplitude of the core 87.

In the coated article taking up step S7, the heat-resistant separator original sheet 12b is taken up on the core 87 while the thickness unevenness 75 which is caused along the machine direction of the heat-resistant separator original sheet 12b is dispersed in the transverse direction TD. In this case, the position of the thickness unevenness 75 in the heat-resistant separator original sheet 12b, which has been taken up, is dispersed by a distance corresponding to the entire amplitude of the core 87 (i.e., half amplitude×2). Therefore, as illustrated in (b) of FIG. 6, it is possible to lower a protrusion 76 on the surface of the heat-resistant separator original sheet 12b which protrusion 76 occurs due to the thickness unevenness 75.

On the other hand, in the coated article taking up step S7, if the heat-resistant separator original sheet 12b is taken up while the core 87 is not oscillated, the position of the thickness unevenness 75 in the heat-resistant separator original sheet 12b which has been taken up does not change. In such a case, as illustrated in (c) of FIG. 6, the protrusion 76 caused due to the thickness unevenness 75 is emphasized and becomes larger, as the number of times of winding the heat-resistant separator original sheet 12b increases.

As such, in the coated article taking up step S7, the heat-resistant separator original sheet 12b is taken up while the core 87 is oscillated in the transverse direction TD of the heat-resistant separator original sheet 12b, and this makes it possible to improve planarity of the surface of the heat-resistant separator original sheet 12b that has been wound into the roll 5.

A method for oscillating the core 87 in the transverse direction TD is not limited to a particular one and can be, for example, a method in which an oscillation device including a motor, an oil hydraulic cylinder, and the like is employed and a take-up roller 80 that is provided inside the core 87 so as to pierce through the core 87 is oscillated in the transverse direction TD.

An oscillation pattern in which the core 87 is oscillated in the transverse direction TD is not limited to a particular one and is preferably an oscillation pattern in which the heat-resistant separator original sheet 12b is oscillated without imbalance when averaged in the machine direction of the heat-resistant separator original sheet 12b. The oscillation pattern of the core 87 may include a constant speed but is preferably an oscillation pattern in which a moving speed becomes lower as the core 87 approaches a point at which a moving direction in back-and-forth motion changes.

The amplitude of the core 87 in the coated article taking up step S7 is preferably 1 mm or more and 30 mm or less. With the amplitude of the core 87 which amplitude is set to fall within the above range, it is possible to suitably bring about an effect of improving the planarity of the surface of the heat-resistant separator original sheet 12b which has been wound into the roll 5.

Moreover, in the coated article taking up step S7, an oscillation cycle of the core 87 is preferably, for example, 2 seconds (s) or more and 180 seconds (s) or less, and a transferring speed (taking-up speed) of the heat-resistant separator original sheet 12b is preferably, for example, 0.01 m/s or more and 5 m/s or less. By setting the oscillation cycle of the core 87 and the transferring speed to fall within the above ranges in the coated article taking up step S7, it is possible to take up the heat-resistant separator original sheet 12b while maintaining productivity of products without applying an excessive load to the heat-resistant separator original sheet 12b.

(Coated Article Winding Off Step S8)

The coated article winding off step S8 is a step of winding off the heat-resistant separator original sheet 12b from the roll 5 which has been obtained in the coated article taking up step S7. As above described, in the roll 5, the heat-resistant separator original sheet 12b is wound on the core 87 so as to be laminated in a state of being distorted in a wavelike manner in the transverse direction TD. Therefore, in the coated article winding off step S8, the heat-resistant separator original sheet 12b is wound off in the state of being distorted in a wavelike manner in the transverse direction TD.

(Transferring Step S9)

In the transferring step S9, the heat-resistant separator original sheet 12b which has been wound off in the coated article winding off step S8 is transferred to the subsequent slitting step S10 such that the state of being distorted in a wavelike manner in the transverse direction TD is maintained. Note that details of the transferring step S9 will be described later.

(Slitting Step S10)

The slitting step S10 is a step of slitting (cutting) the heat-resistant separator original sheet 12b transferred in the transferring step S9 into parts each having a predetermined product width. Specifically, in the slitting step S10, the heat-resistant separator original sheet 12b is slit into parts each having a product width which is suitable for an applied product such as the lithium-ion secondary battery 1.

In order to increase productivity, the heat-resistant separator original sheet 12b is usually produced so as to have a width that is equal to or greater than the product width. After the heat-resistant separator original sheet 12b is produced with a width equal to or greater than the product width, the heat-resistant separator original sheet 12b is slit into heat-resistant separators 12a each having the product width.

(Details of Transferring Step S9)

FIG. 7 is a top surface view illustrating an example of the coated article winding off step S8, the transferring step S9, and the slitting step S10 which are shown in FIG. 4. As illustrated in FIG. 7, those steps are carried out by a wind-off roller 81 and a plurality of transferring rollers 88 each of which (i) has a columnar shape and (ii) is rotatably supported, a slitting device 6, and the like. The roll 5 is fitted on the wind-off roller 81.

The wind-off roller 81 and the plurality of transferring rollers 88 are provided so that their rotation axes extend in a direction perpendicular to the machine direction of the heat-resistant separator original sheet 12b and the thickness direction of the heat-resistant separator original sheet 12b. Moreover, the plurality of transferring rollers 88 are aligned in the machine direction MD.

The slitting device 6 includes a plurality of slitting sections 7. Each of the plurality of slitting sections 7 has a razor blade (not illustrated). Each of the plurality of slitting sections 7 is provided in the slitting device 6 so that a positional relation with the heat-resistant separator original sheet 12b which is transferred is fixed.

As early described, in the roll 5, the heat-resistant separator original sheet 12b is wound on the core 87 so as to be laminated in a state of being distorted in a wavelike manner in the transverse direction TD. Therefore, in the coated article winding off step S8, the heat-resistant separator original sheet 12b is to be wound off in the state of being distorted in a wavelike manner in the transverse direction TD.

In the present embodiment, a distance W1 between a rotation axis of the wind-off roller 81 and a rotation axis of a transferring roller 88 which is adjacent to the wind-off roller 81 and a distance W2 between rotation axes of adjacent two transferring rollers 88 are set in order to transfer the heat-resistant separator original sheet 12b such that the state of being distorted in a wavelike manner in the transverse direction TD is maintained.

Specifically, each of the distance W1 and the distance W2 is set to be equal to or less than a value obtained by the following formula: Oscillation cycle T×taking-up speed V÷4, where an oscillation cycle of the core 87 in the coated article taking up step S7 is defined by T [s], and a taking-up speed (transferring speed) of the heat-resistant separator original sheet 12b in the coated article taking up step S7 is defined by V [m/s]. In other words, each of the distance W1 and the distance W2 is set to be equal to or less than a half of an interval between a top part t and a bottom part b which is adjacent to (continuous with) the top part t in the end part E of the heat-resistant separator original sheet 12b which is in the state of being cyclically distorted in a wavelike manner in the transverse direction TD (that is, each of the distance W1 and the distance W2 is set to be equal to or less than a quarter of a wavelength λ of the end part E which is in a wave form).

In a case where each of the distance W1 and the distance W2 is set to be equal to or less than the value obtained by oscillation cycle T×taking-up speed V÷4, it is possible to transfer the heat-resistant separator original sheet 12b by the plurality of transferring rollers 88 such that the state of being distorted in a wavelike manner in the transverse direction TD is maintained.

The transferring speed of the heat-resistant separator original sheet 12b in the transferring step S9 is preferably, for example, 0.01 m/s or more and 5 m/s or less. In a case where the transferring speed of the heat-resistant separator original sheet 12b in the transferring step S9 is set to fall within the above range, it is possible to suitably transfer the heat-resistant separator original sheet 12b by the plurality of transferring rollers 88 such that the state of being distorted in a wavelike manner in the transverse direction TD is maintained.

Moreover, a transferring tension of the heat-resistant separator original sheet 12b in the transferring step S9 is normally 10 N/m or more and 250 N/m or less, preferably 20 N/m or more and 200 N/m or less, and more preferably 30 N/m or more and 180 N/m or less. In a case where the transferring tension is 10 N/m or more, a wrinkle preferably hardly occurs in the separator original sheet 12b. In a case where the transferring tension is 250 N/m or less, it is possible to suitably transfer the heat-resistant separator original sheet 12b by the plurality of transferring rollers 88 such that the state of being distorted in a wavelike manner in the transverse direction TD is maintained.

The heat-resistant separator original sheet 12b which has been transferred to the slitting device 6 by the plurality of transferring rollers 88 is slit substantially parallel to the machine direction MD. As a result, a plurality of heat-resistant separators 12a, into which the separator original sheet 12c has been slit so as to have the product width, are produced. The plurality of heat-resistant separators 12a thus produced are wound on a core (not illustrated).

With the configuration in which the heat-resistant separator original sheet 12b which has been transferred such that the state of being distorted in a wavelike manner in the transverse direction TD is maintained is slit, even in a case where the thickness unevenness 75 is caused along the machine direction of the heat-resistant separator original sheet 12b, it is possible to slit the heat-resistant separator original sheet 12b while dispersing the thickness unevenness 75 in the transverse direction TD.

This makes it possible to improve planarity of a surface of each of the plurality of heat-resistant separators 12a which are in a state of being wound on the outer peripheral surface of the core so as to be laminated.

[Main Points]

As such, the method for producing a separator in accordance with the present embodiment includes the coated article taking up step S7 of taking up the heat-resistant separator original sheet 12b by winding the heat-resistant separator original sheet 12b on an outer peripheral surface of the core 87 while oscillating the core 87 in the rotation axis direction; the coated article winding off step S8 of winding off the heat-resistant separator original sheet 12b, which has been taken up in the coated article taking up step S7, from the core 87; and the transferring step S9 of transferring the heat-resistant separator original sheet 12b, which has been wound off in the coated article winding off step S8, such that a state of being distorted in a wavelike manner in the rotation axis direction is maintained.

In a case where the heat-resistant separator original sheet 12b which has been wound on the outer peripheral surface of the core 87 while the core 87 is oscillated in the rotation axis direction is wound off, the heat-resistant separator original sheet 12b is wound off in a state of being distorted in a wavelike manner in the transverse direction TD.

The method for producing a separator in accordance with the present embodiment includes the transferring step S9 of transferring the heat-resistant separator original sheet 12b, which has been wound off in the coated article winding off step S8, such that the state of being distorted in a wavelike manner in the transverse direction TD is maintained. It is therefore possible to introduce the heat-resistant separator original sheet 12b, which is in the state of being distorted in a wavelike manner in the transverse direction TD, to the subsequent step.

Therefore, according to the present embodiment, it is possible to provide the method for producing a separator with which method it is possible to carry out a process with respect to the heat-resistant separator original sheet 12b in the state of being distorted in a wavelike manner in the transverse direction TD without carrying out oscillation again.

In the present embodiment, the film production method in accordance with an aspect of the present invention has been described with reference to the example in which the film production method is applied to production of a separator for a lithium-ion secondary battery. Note, however, that the present invention is not limited to this example. The film production method in accordance with an aspect of the present invention is also applicable to production of various films other than the separator for a lithium-ion secondary battery.

[Remarks]

The film production method in accordance with an aspect of the present invention includes the steps of: taking up a film by winding the film on an outer peripheral surface of a core while oscillating the core in a rotation axis direction; winding off the film, which has been taken up in the taking up step, from the core; and transferring the film, which has been wound off in the winding off step, such that a state of being distorted in a wavelike manner in the rotation axis direction is maintained.

In a case where a film which has been wound on an outer peripheral surface of a core while the core is oscillated in a rotation axis direction is wound off, the film is wound off in a state of being distorted in a wavelike manner in a transverse direction of the film (i.e., in the rotation axis direction of the core).

The configuration includes the transferring step of transferring the film, which has been wound off in the winding off step, such that the state of being distorted in a wavelike manner in the transverse direction is maintained. It is therefore possible to introduce the film, which is in the state of being distorted in a wavelike manner in the transverse direction, to the subsequent step.

Therefore, according to the configuration, it is possible to provide the film production method with which it is possible to carry out a process with respect to the film, which is in the state of being distorted in a wavelike manner in the transverse direction, without carrying out oscillation again.

In the film production method in accordance with an aspect of the present invention, it is preferable that, in the transferring step, the film is transferred by a plurality of transferring rollers which are provided so that rotation axes of the respective plurality of transferring rollers extend in a direction perpendicular to a machine direction of the film and a thickness direction of the film and are aligned in the machine direction.

According to the configuration, for example, by setting intervals between transferring rollers which are generally used in a film production process to an appropriate value, it is possible to transfer the film by the transferring rollers such that the state of being distorted in a wavelike manner in the transverse direction is maintained.

In the film production method in accordance with an aspect of the present invention, it is preferable that a distance between rotation axes of adjacent two of the plurality of transferring rollers is equal to or less than a value obtained by the following formula: Oscillation cycle T×taking-up speed V÷4, where an oscillation cycle of the core in the taking up step is defined by T [s], and a taking-up speed of the film in the taking up step is defined by V [m/s].

According to the configuration, the distance between rotation axes of the adjacent two transferring rollers is set to be equal to or less than the value obtained by oscillation cycle T×taking-up speed V÷4. This makes it possible to suitably transfer the film by the plurality of transferring rollers such that the state of being distorted in a wavelike manner in the transverse direction is maintained.

The film production method in accordance with an aspect of the present invention preferably further includes the step of: slitting the film, which has been transferred in the transferring step, into parts each of which has a predetermined product width.

According to the configuration, the film which is in the state of being distorted in a wavelike manner in the transverse direction is slit in a predetermined product width. Therefore, even in a case where a thickness unevenness occurs along the machine direction of the film, it is possible to slit the film in a state where the thickness unevenness is dispersed in the transverse direction.

Therefore, for example, it is possible to improve planarity of a surface of a film which has been slit to have a predetermined product width and is being wound on an outer peripheral surface of a cylindrical member so as to be laminated.

In the film production method in accordance with an aspect of the present invention, it is possible that a functional layer is provided on at least one of a front surface and a back surface of the film.

An aspect of the present invention is applicable to a film which includes a functional layer that is provided on at least one of a front surface and a back surface of the film.

According to the configuration, it is possible to carry out various processes with respect to the film on which the functional layer is provided and is in the state of being distorted in a wavelike manner in the transverse direction, without carrying out oscillation again.

The present invention is not limited to the embodiments, but can be altered by a skilled person in the art within the scope of the claims. An embodiment derived from a proper combination of technical means each disclosed in a different embodiment is also encompassed in the technical scope of the present invention.

REFERENCE SIGNS LIST

1: Lithium-ion secondary battery
4: Heat-resistant layer (functional layer)
12: Separator (film)
12a: Heat-resistant separator (film)
12b: Heat-resistant separator original sheet (film)
12c: Separator original sheet (film)
87: Core
S7: Coated article taking up step (taking up step)
S9: Transferring step
S10: Slitting step
TD: Transverse direction (rotation axis direction)

The invention claimed is:

1. A method for producing a film, said method comprising the steps of:
taking up a film by a first step of winding the film on an outer peripheral surface of a core while oscillating the core in a rotation axis direction, such that the film is in a state of being distorted in a wavelike manner in the rotation axis direction;
a second step of winding off the film, which has been taken up in the taking up step and is in the state of being distorted in the wavelike manner in the rotation axis direction, from the core; and transferring the film, which has been wound off in the second winding off step, such that the state of being distorted in the wavelike manner in the rotation axis direction is maintained.

2. The method as set forth in claim 1, wherein:
in the transferring step, the film is transferred by a plurality of transferring rollers which are provided so that rotation axes of the respective plurality of transferring rollers extend in a direction perpendicular to a machine direction of the film and a thickness direction of the film and are aligned in the machine direction.

3. The method as set forth in claim 2, wherein:
a distance between rotation axes of adjacent two of the plurality of transferring rollers is equal to or less than a value obtained by the following formula:

$$\text{Oscillation cycle } T \times \text{taking-up speed } V \div 4$$

where an oscillation cycle of the core in the taking up step is defined by $T$ [s], and a taking-up speed of the film in the taking up step is defined by $V$ [m/s].

4. The method as set forth in claim 1, further comprising the step of:
slitting the film, which has been transferred in the transferring step, into parts each of which has a predetermined product width.

5. The method as set forth in claim 1, wherein:
a functional layer is provided on at least one of a front surface and a back surface of the film.

* * * * *